(12) United States Patent
Moseley et al.

(10) Patent No.: US 6,988,304 B2
(45) Date of Patent: Jan. 24, 2006

(54) METHOD OF CONTAINING A PHASE CHANGE MATERIAL IN A POROUS CARBON MATERIAL AND ARTICLES PRODUCED THEREBY

(75) Inventors: Douglas D. Moseley, Uniontown, OH (US); Douglas Fate, Dalton, OH (US); Max L. Lake, Yellow Springs, OH (US); Joseph W. Hager, Dayton, OH (US); David J. Burton, Waynesville, OH (US); Chi Tang, Concord, NC (US)

(73) Assignee: Aircraft Braking Systems Corporation, Akron, OH (US)

( * ) Notice: Subject to any disclaimer, the term of this patent is extended or adjusted under 35 U.S.C. 154(b) by 209 days.

(21) Appl. No.: 10/130,394

(22) PCT Filed: Jun. 14, 2001

(86) PCT No.: PCT/US01/19263

§ 371 (c)(1),
(2), (4) Date: Dec. 16, 2002

(87) PCT Pub. No.: WO01/96061

PCT Pub. Date: Dec. 20, 2001

(65) Prior Publication Data

US 2003/0145447 A1    Aug. 7, 2003

(51) Int. Cl.
*B23P 25/00*    (2006.01)

(52) U.S. Cl. .................................................. 29/458
(58) Field of Classification Search ............... 29/458, 29/428; 428/408, 367; 264/29.5; 427/228
See application file for complete search history.

(56) References Cited

U.S. PATENT DOCUMENTS 5,000,252 A * 3/1991 Faghri .......................... 165/10
5,683,757 A * 11/1997 Iskanderova et al. ....... 427/525

* cited by examiner

*Primary Examiner*—John C. Hong
(74) *Attorney, Agent, or Firm*—Renner, Kenner, Greive, Bobak, Taylor & Weber

(57) ABSTRACT

A process for fabricating a carbon composite structure that is lightweight, structurally sound, and characterized by high heat capacity. A carbon structure is devised with cavities therein receiving a phase change medium. The phase change medium demonstrates both high energy absorption capacity and high thermal conductivity and is formed from a carbon fiber to establish a high porosity medium having a large volume fraction. The surface energy of the carbon fibers is enhanced in various ways as by deposition of a carbide former, a metallurgical coating or a precursor liquid or by electroplating or etching the surfaces of the carbon fibers. The enhanced surface energy allows for the retention of phase change material.

17 Claims, 7 Drawing Sheets

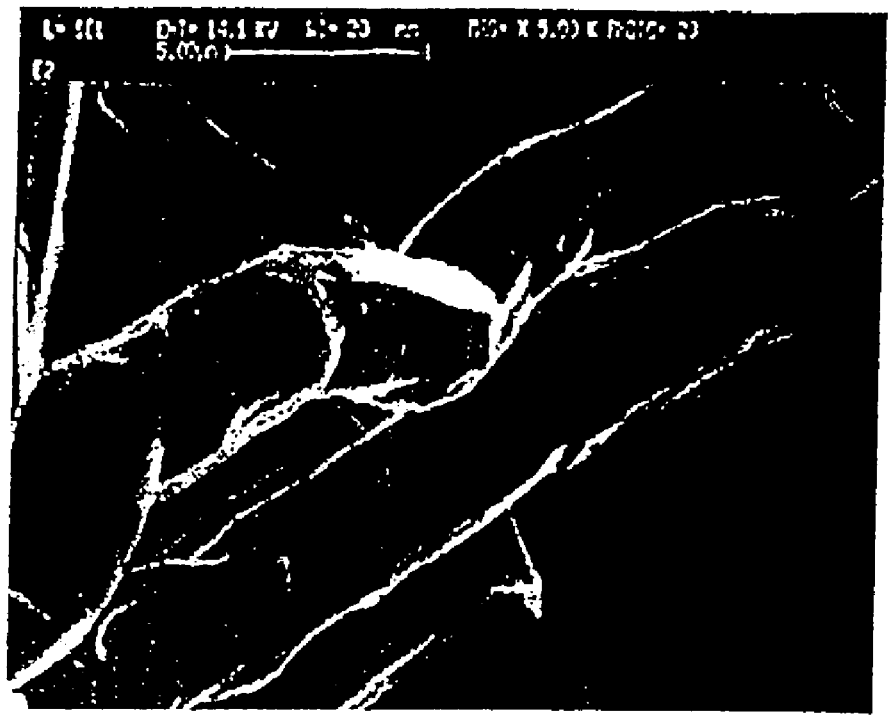
Figure 1: Scanning electron micrograph of a bare Pyrograf I fiber.

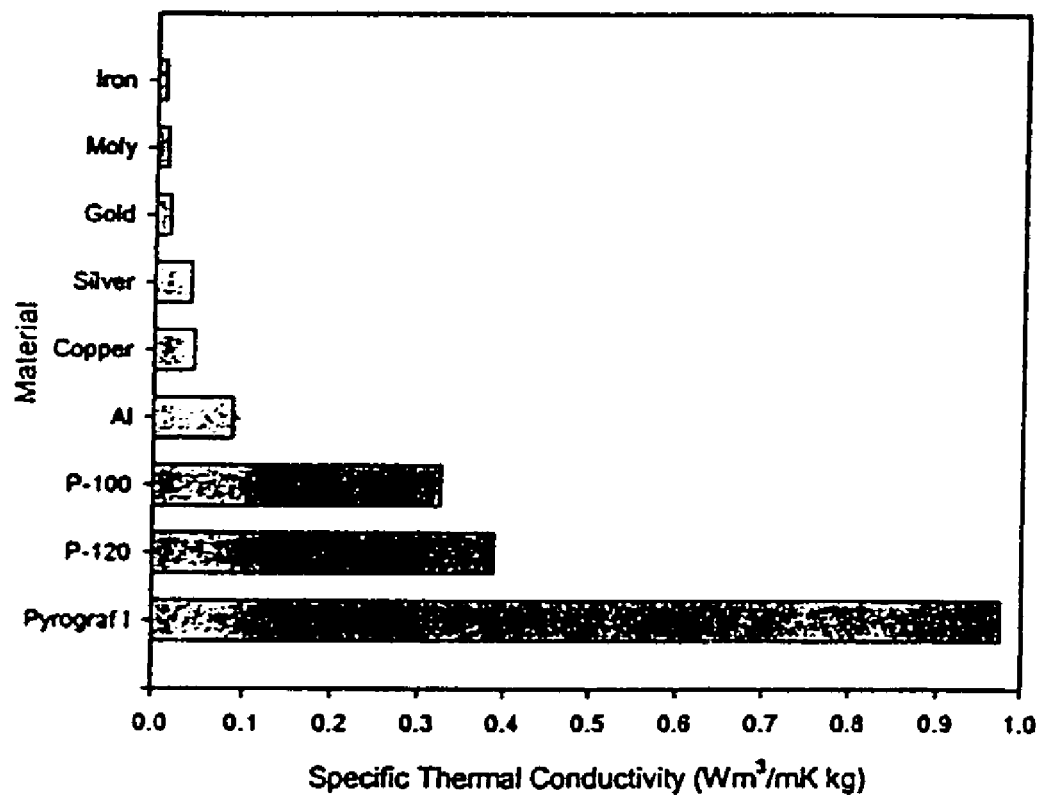
Figure 2: Specific thermal conductivity comparison.

Figure 3: Si-based coating CVD deposited on Pyrograf I fibers.

Figure 4: Fracture surfaces of Pyrograf I™ coated with the Si-based coating and successfully infiltrated with PCMs
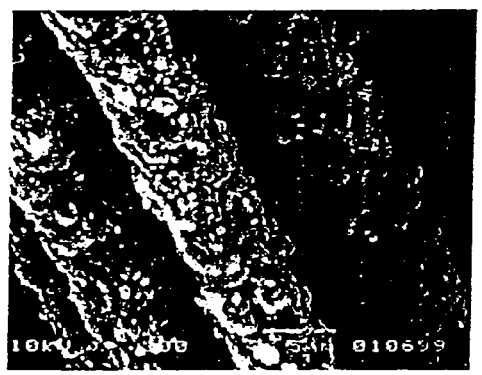
Figure 5: PCM attached to oxidized fiber.

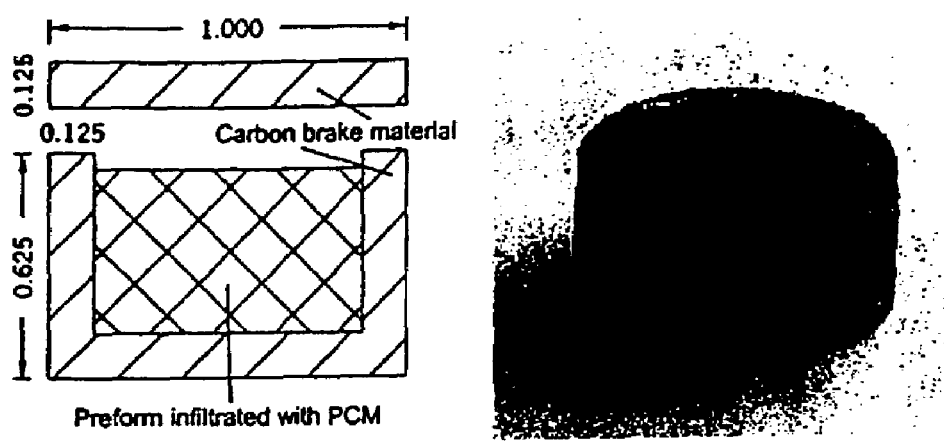
Figure 6: A schematic (left) and a photo (right) of test coupon assembly.

Figure 7: Damaged coating.
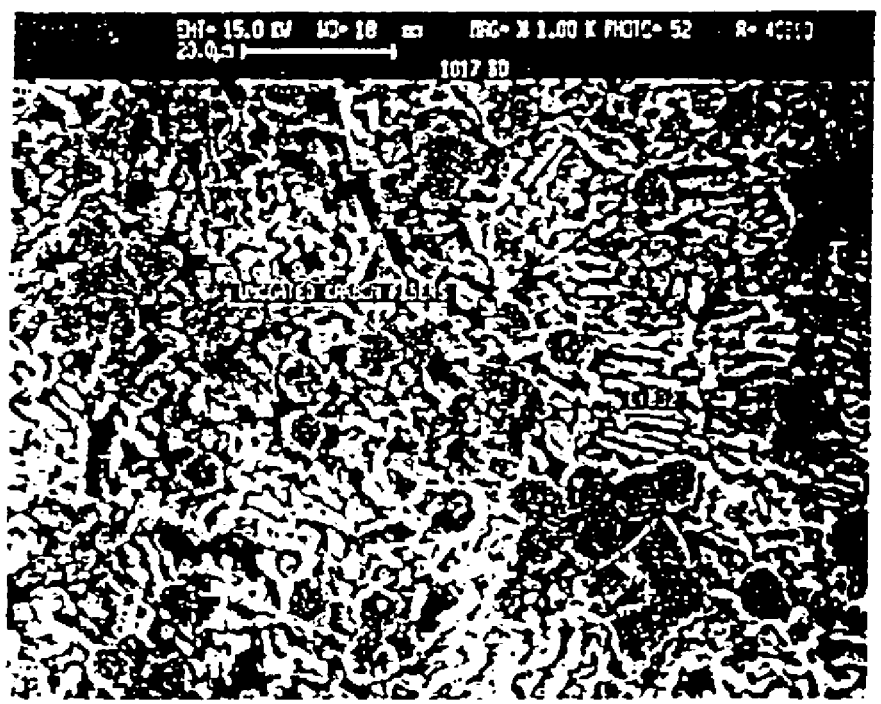
Figure 8: Post torch test SEM picture.

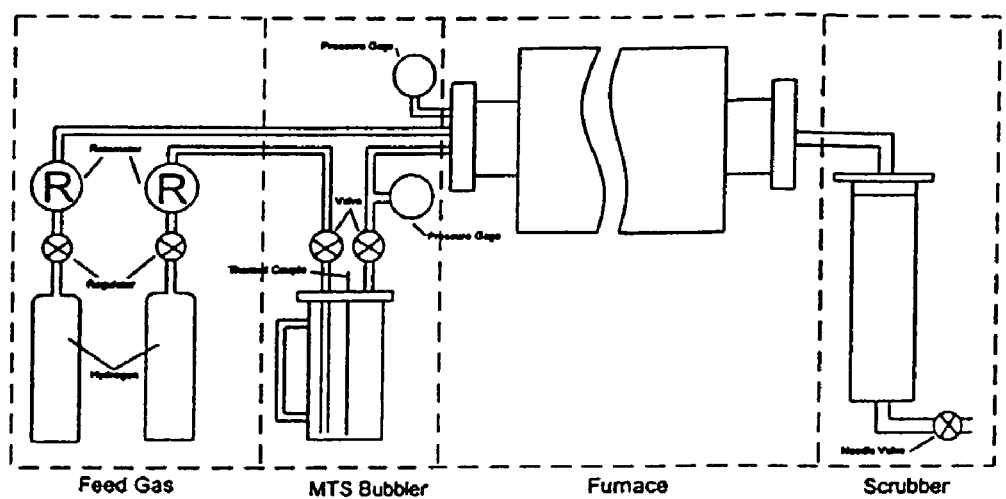
Figure 9: SiC coating equipment.

METHOD OF CONTAINING A PHASE CHANGE MATERIAL IN A POROUS CARBON MATERIAL AND ARTICLES PRODUCED THEREBY

TECHNICAL FIELD

The invention herein resides in the art of the formation of carbon composite structures. More particularly, the invention relates to a process for forming carbon composite structures having a phase change medium therein. Specifically, the invention relates to a process for forming a high porosity phase change medium for retaining a phase change material within a carbon composite structure.

BACKGROUND OF THE INVENTION

The present invention relates to a method of containment of a phase change material within a porous carbon material for the purpose of elevating the energy absorption capacity and performance of devices made with the material, such as brake disks and articles produced thereby. More particularly, the invention provides a method of incorporating and containing salts based on lithium within carbon/carbon composites, and particularly aircraft brake disks fabricated therefrom, in such a manner that the lithium salts undergo melting within an overload condition, absorbing energy from the overload. The molten lithium salts are constrained from escaping the porous carbon/carbon composite in the present system.

The function of aircraft brakes is to convert the kinetic energy of a rolling aircraft mass into thermal energy as the aircraft is brought to a rest. The ideal brake materials should exhibit a high coefficient of friction, be able to withstand the imposed mechanical stresses at elevated temperatures, and have a high specific heat. To minimize the weight liability associated with the braking function, the brakes should be as light as possible. Carbon-carbon composites offer a number of performance advantages over other brake materials in this application, and are becoming widely used for both military and civilian aircraft.

If aircraft brakes could be designed to handle only the loading associated with taxiing and normal landings, they could be made to be smaller and lighter than current designs, providing for lower operational costs for the aircraft over its service life. Unfortunately, the brakes must also be able to handle the loading associated with emergency braking. Such emergency braking produces a heat overload to the brake system. While the carbon/carbon composite material used for the frictional material in the brake can withstand high temperatures without structural degradation, friction coefficient or braking efficiency degrades at high temperatures and the remainder of the brake structure and wheel housing are susceptible to damage and even catastrophic failure from heat overload.

The most extreme of the braking overload conditions is represented by a rejected takeoff (RTO). An RTO is the perhaps once-in-an-aircraft-lifetime event in which the pilot of a fully-loaded and fully-fueled aircraft must abort its takeoff roll, and attempt to bring the aircraft to a full stop, using only the brakes. Such panic stops may require up to five times the thermal energy absorption of ordinary braking. Often the heat overload is so extreme that the entire brake and wheel assembly is damaged and must be replaced.

Currently, the approach for accommodating braking overload or an RTO is to make the brakes larger. However, the additional weight required to enable overload braking capacity represents a permanent loss of fuel and payload capacity for the aircraft. Since emergency or overload braking is an infrequent contingency condition, it would be desirable to develop lighter alternatives to accommodate this possibility.

One alternative that has been proposed to reduce the weight penalty associated with braking overload accommodation is the incorporation of phase change materials (PCMs) into the brake disk. The steel or carbon-carbon composite materials normally used for brakes absorb thermal energy as a product of their intrinsic specific heat, the mass, and the temperature increase experienced as a consequence of frictional contact. The advantage of incorporating PCMs into the brake system can be illustrated by considering the melting of ice, i.e., the change of phase from solid to liquid for $H_2O$. The so-called heat of fusion of 333 Joules per gram must be added to ice at 0-C. in order to melt the ice into water. The temperature of the ice and water mixture will not increase until all the ice in the mixture is melted. By comparison, storing 333 Joules per gram of energy in liquid water raises its temperature 80° C., so the phase change effect is a dramatic way to store thermal energy without increasing the temperature of the material.

This phenomenon is generally true for phase changes in matter—PCMs absorb thermal energy, with no increase in temperature, as they change phase by means of their latent heats of fusion and vaporization. Thus, during the heating associated with an extraordinary braking event, a large amount of thermal energy could be absorbed by PCMs incorporated in the brake disks through either melting or vaporization while minimizing the temperature increase of the brake system.

The PCM brake concept entails minimizing the weight of the brake rotors and stators by increasing the heat capacity of the brake material. A cavity is machined or otherwise formed into the carbon/carbon material and PCM is inserted into a specialized insert within the cavity. During normal braking, the carbon-carbon material and solid phase PCMs provide sufficient thermal mass to absorb the braking energy without raising the temperature above the PCM liquidus. During extreme braking, the rotor/stator assembly gets much hotter. To protect the brake assembly, the selected PCM should melt, and absorb the heat of fusion during the phase change. After such extreme braking events, which can be expected several times during the life of the brakes, the PCM should ideally re-solidify within its cavity.

During an RTO, the temperature becomes so hot that the PCM would first melt and, most likely, then vaporize. Vaporization would result in pressure build-up within the volume containing the PCM, most likely resulting in diffusion of the vaporous PCM from its retaining volumes. Since an RTO currently causes heat build-up and damage to the entire wheel and brake assembly sufficient to warrant replacement of the assembly, loss of PCM in this circumstance would not entail any additional repair and maintenance.

Phase change materials (PCMs) have been utilized in a variety of thermal management solutions. Refrigerator coolants operate through the absorption and release of the heat of vaporization of the coolant, to pump heat from one part of the refrigeration system to another. In other applications of PCMs, the heat of fusion is utilized to absorb large quantities of heat with minimal increase in temperature to enhance performance of brake materials (see U.S. Pat. No. 5,139,118 to Schenk and U.S. Pat. No. 5,370,814 to Salyer).

However, attempts to fabricate a PCM brake assembly have not been completely successful. Moseley, et al., U.S. Pat. No. 5,613,578, suggests filling brake disk cavities with PCM, thus achieving higher heat capacity. However, the filled disk does not retain, restrict or contain PCM during phase changing, which can result in significant PCM loss. Clearly a high porosity medium, which can serve to retain, restrict or contain PCM during phase changing, is required.

Salyer, U.S. Pat. No. 5,370,814, teaches containment of PCM by mixing PCM with silica particles, which is not suitable for aircraft brake assembly because silica has low thermal conductivity, which would impair the heat flow from brake disk to PCM. Additionally, a silica/PCM mix does not take PCM volume expansion during phase changing into consideration, which can cause significant PCM loss when used in fixed cavity.

The prior art describes a potential improvement in the heat capacity of the brake, but does not specify how to package the phase change material so that it will be contained in a cavity within the brake disk. The salts of lithium (e.g., lithium fluoride, LiF; lithium metaborate, $LiBO_2$; and lithium tetraborate, $Li_2B_4O_7$) are candidate PCMs based on their melting temperatures, heats of fusion, and heats of vaporization. These salts also undergo a significant expansion upon melting from the solid state. Because of this, the PCM's are preferentially deposited within the inserts, leaving the necessary void to accomodate the material's expansion. Because carbon/carbon composites used in aircraft brakes are porous, the composites are permeable. Thus an expected outcome of a melting phase change in the salts of lithium is that air pressure on the inside of the cavity caused by the expansion of the PCM will force the liquid PCM through the walls of the carbon/carbon brake disk. The PCM would then be lost for future emergency brake operation, and repair and maintenance would be required. Also, liquid PCM could then come into contact with the wheel assembly, water vapor, de-icing fluids, and hydraulic fluids. Thus such loss of the PCM is destructive to the continued function of the brake.

Accordingly, the prior art clearly has several limitations, including the lack of a high thermal conductivity network interspersed with the PCM that distributes the energy created during braking uniformly and rapidly through the mass of the PCM. Without a high thermal conductivity network, the PCM will begin to vaporize at the heating surface before the bulk of PCM is melted. Another limitation of the prior art is the lack of containment of PCM as it is converted from an immobile solid phase to a mobile liquid phase. The prior art has no method of retaining the PCM as it melted, thus allowing the PCM to exit the brake through the porous carbon disk material.

Accordingly, there is still a need in the art for a method of containing a phase change material within a porous material for use in applications such as brake disks.

SUMMARY OF THE INVENTION

In designing an appropriate package for the PCM within the brake cavity, three major factors must be considered:

1) Thermal Conductivity—Although phase change materials have a high-energy absorption capacity at their transition temperatures, they typically exhibit very low thermal conductivity. Without enhancing the thermal conductivity of the PCM, the heat generated at the rubbing surfaces cannot be transferred rapidly enough into the PCM mass for it to act as a heat sink.
2) Thermal Expansion—The lithium compounds described above exhibit extremely high volume expansions upon the solid-liquid phase transition. The expansion/contraction must be accommodated in the package design.
3) Containment—The fact that the PCM constituent can become a mobile phase when it converts to a liquid or a gas implies that there must be some means of containing it. Containment of the liquid PCM is the most important issue, since liquefaction of the PCM may occur several times during the life of the brakes, while vaporization of the PCM resulting from an RTO would lead to wheel and brake replacement. Liquid containment is particularly challenging in view of the large volume expansion associated with liquefaction.

The present invention addresses the limitations of the prior art in the practical use of PCM in aircraft brakes by providing a method by which highly graphitic materials, particularly highly graphitic carbon fibers, and more particularly vapor grown carbon fibers, may be surface modified to elevate the surface energy, and thereby be wet by molten salts such as salts based on lithium, including, but not limited to, lithium metaborate, lithium tetraborate, and lithium fluoride. Notably, in order to cause a solid material to be wet by a liquid material, it is generally necessary that the solid material have a higher surface energy than the liquid.

Carbon fibers and foam, particularly those carbon material fibers with a high graphitization index, and more particularly heat treated vapor grown carbon fibers, are known to have a low surface energy on the order of 15 to 30 ergs/cm$^2$ while molten salts are known to have higher surface energies on the order of hundreds of ergs/cm$^2$.

Surface modification of the graphitic surface of carbonaceous materials, including carbon fibers, may be achieved by coating with carbide formers such as silicon, tantalum, titanium, and molybdenum. The carbide interface provides a robust bond to the graphitic surface that will survive numerous thermal cycles. Other metallic or ceramic coatings, such as nickel, can similarly present a high surface energy to the molten salts. The choice of coating material can be made based on the best combination of surface energy, compatibility and stability of the selected PCM/coating system during the desired range of thermal cycling.

Alternatively, the graphitic surface may be modified by oxidation processes conducted at elevated temperature such that active carbon sites are thereby created in the graphene planes comprising the surface of the graphitic structure. Suitable oxidizing agents include oxygen, carbon monoxide, carbon dioxide, and water vapor or acid treatments such as nitric acid or peracetic acid. Oxidation of the graphitic surface is preferably carried out in a manner so as not to leave fugitive functional groups on the activated surface, so that the surface can more successfully survive repeated thermal cycling. A surface modification agent may alternatively be introduced through chemical vapor infiltration (CVI), for example by a method of heterogeneous thermal decomposition of a gaseous precursor on the fiber surface, such as by the method of heterogeneous thermal decomposition of methyl trichlorosilane on the fiber surface maintained at a temperature above that required to form a carbide from the infiltrated surface modification agent.

The present invention incorporates three distinct features that allow for the practical use of PCM in aircraft brakes. The first feature of the invention is the incorporation of high thermal conductivity carbon fibers into the PCM to form a low density composite with a high thermal conductivity. The porous composite houses the PCM in the solid and liquid states and provides a pathway for energy created during the braking operation to be uniformly and quickly distributed throughout the PCM mass. Although the invention contemplates various types of porous, highly thermally conductive composites, one such composite is made possible by using a unique carbon fiber, termed Pyrograf-I (FIG. 1), available from Applied Sciences, Inc., Cedarville, OH, with a specific thermal conductivity of 0.98 W-m$^3$/m-K-kg, or roughly twenty times the specific thermal conductivity of copper (FIG. 2).

Alternatively, a carbon structure could be synthesized using a porous, high thermal conductivity carbon foam. Mesophase-pitch-derived carbon foams have been shown to exhibit densities ranging from 0.2 to 0.6 g/cm$^3$, with an isotropic thermal conductivity which varies with density from 40 to 150 W/m-K$^1$. The specific thermal conductivity is therefore about six times that of copper. While the specific thermal conductivity of vapor grown carbon fiber (VGCF) preforms is substantially higher than that of the foam, the thermal conductivity is highly anisotropic. Depending on the desired heat transport directions for the application, isotropy in thermal conductivity could be favored over anisotropy. In such instances, preforms fabricated from high thermal conductivity mesophase-pitch-derived carbon foams could offer advantages over VGCF preforms. A surface conditioning strategy for raising the surface energy of the carbon foam may be applied.

The second feature of the invention is the method of liquid PCM retention. Retention of the mobile liquid PCM is achieved through capillary attraction caused by favorable surface energies. Capillary attraction requires that the surface energy of the solid be greater than the surface energy of the liquid, that the magnitude of the surface tension of the liquid be sufficiently high, that the density of liquid be sufficiently small, and that the size of the capillary be sufficiently small. The current invention possesses these requirements for capillary action by controlling the density of the composite, through the use of surface treatments on the carbon fiber composite, and the selection of appropriate phase change materials.

The third feature of the invention is that it is an open system that accommodates the volume expansion of the PCM and the release of any pressure generated from heated or displaced gasses.

The foregoing and other features of the invention are attained by a process for fabricating a carbon composite structure that is lightweight, structurally sound, and characterized by high heat capacity, comprising: forming a carbon structure with at least one cavity therein; placing a phase change medium within said cavity, said phase change medium demonstrating high energy absorption capacity, high thermal conductivity, and high void volume for phase change material retention; and closing said phase change medium within said cavity to allow vapor diffusion and liquid containment.

BRIEF DESCRIPTION OF THE DRAWINGS

FIG. 1 is scanning electron micrograph of a bar Pyrograf I fiber;

FIG. 2 is a graph comparing the thermal conductivity of Pyrograf I fibers with other materials;

FIG. 3 is a scanning electron micrograph of an Si-based coating CVD deposited on Pyrograph I fibers;

FIG. 4 is a scanning electron micrograph of fractured surfaces of coated Pyrograf fibers successfully infiltrated with PCMs;

FIG. 5 is a scanning electron micrograph illustrating PCM attached to oxidized fiber;

FIG. 6 is a schematic illustration and a photo of a test coupon assembly;

FIG. 7 is a scanning electron micrograph of a damaged coating;

FIG. 8 is a scanning electron micrograph taken after a post torch test; and

FIG. 9 is a schematic illustration of the SiC coating equipment.

DETAILED DESCRIPTION OF THE INVENTION

A contemplated embodiment of the present invention utilizes a porous, rigid composite of aligned Pyrograf-I vapor-grown carbon fiber that is held together with a low char yield binder. The fiber fraction determines the thermal conductivity, mechanical properties, and porosity of the composite. The composite provides a structure to serve as a phase change medium to contain the PCM, and also to provide thermal transport from the brake disk surface into the PCM. While the thermal conductivity of the composite is required to equal or exceed the conductivity of the brake disk carbon/carbon, the porosity of the phase change medium should be maximized in order to maximize the quantity of PCM that can be stored in the composite. Thus the fiber loading must be as low as possible to yield the highest possible porosity while maintaining a thermal conductivity that exceeds the conductivity of the brake disk material.

Fabrication of a high void composite, however, poses a significant challenge. Composites of high porosity are difficult to make due to large voids in the bulk. Preferred processes for making vapor grown carbon fibers for the carbon/carbon composites are described in U.S. Pat. Nos. 5,374,415, and 5,594,060, the disclosures of which are hereby incorporated by reference. However, in making the carbon/carbon composites for purposes of the present invention, the binder must be significantly diluted in order to obtain the desired porosity. Composites fabricated with voids of 84%, 83% and 80% demonstrated enough mechanical integrity to be handled normally and, more importantly, be machined.

At least two methods for increasing the surface energy, and thus PCM affinity, of the composite interior are contemplated. A first method coats the interior surface of the composite with a silicon-based coating. A second method of modifying the surface is to activate the surface through oxidation. While various methodologies may be employed to prepare the surface areas of the composite, the two methods just identified have been tested, with the following results.

Method 1—Coating the interior surface of the porous composite was achieved via chemical vapor infiltration (CVI). In the CVI process, hydrogen is bubbled through liquid methyltrichlorosilane (MTS), the coating precursor, and transports the vaporized precursor into the coating chamber that is heated between 900–1100 C. The composite to be coated is positioned a certain distance from the precursor inlet and in a certain orientation in the coating furnace in such a way as to maximize the deposition rate of the coating. The MTS is thermally decomposed onto the interior surface of the composite to create a silicon-based coating that is of sufficient surface energy to wet and attract liquid PCM. The temperature and pressure inside the coating furnace, the total gas flow rate, and the ratio of hydrogen to MTS are regulated to control the chemical composition of the coating, which ultimately affects coating properties such as CTE, density, strength, surface energy, thermal conductivity, heat capacity, and other properties. Since the only function of the coating is to increase the surface energy of the fiber, the volume of the coating should be minimized to allow the void volume to be maximized, to reduce the thermal resistance between the fiber and PCM, and to reduce weight. While the coating thickness may range from 1 to 1000 nanometers, ideally the coating thickness should be 10–250 nanometers. The scanning electron micrographs shown in the figure below represent some of the coatings deposited using the CVI process with MTS as the coating precursor.

Method 2—A novel alternative approach to increasing the surface energy of the porous, high thermal conductivity composite is to use oxidants. Oxygen, carbon dioxide, carbon monoxide, and water can be used to etch the fiber and increase surface energy. Acid baths, such as nitric acid or paracetic acid, may also be used to oxidize the fiber surface. For gaseous oxidation, the porous composite is placed into a reactor at elevated temperatures and an oxidant in the gaseous state is allowed to flow over the composite at such a flow rate as to provide a continuous supply of oxidant and to carry away from the composite any oxidation products. The oxidants etch and form functional groups on the edges of the graphene planes. The functional groups are then subsequently removed by switching the gas flow from an oxidant to hydrogen and increasing the temperature to approximately 1000° C. The high temperature removes the functional groups to create graphene edge sites terminated with hydrogen. It was discovered that the terminated edge sites are stable at elevated temperatures and increase the surface energy of the composite sufficiently to attract liquid PCM.

While it is contemplated various techniques may be employed to incorporate the PCM into a porous, rigid, highly thermally conductive composite, it has been found that an effective approach calls for the porous composite to be inserted into the bottom of a porous fixture that has a bottom and walls taller than the composite to retain the PCM within the fixture during the initial period of the infiltration cycle. The composite, fixture, and PCM charge may then be placed into a furnace and heated to 1200° C. (or as appropriate to melt the PCM) under an inert atmosphere at a sub-atmospheric pressure. These conditions will cause the PCM to melt and be wicked into the porous compound coated with a Si-based coating. A scanning electron micrograph showing PCM attached to coated fiber is presented in FIG. 4 and PCM attached to oxidized fiber in FIG. 5. While the technique just described has been found to be effective, the invention contemplates various techniques for so incorporating different types of PCM within the composite, the choice of coating and parameters of each such technique being determined, in large part, by the type of PCM employed.

An important aspect of the utilization of PCMs in aircraft brake applications is the retention of the PCM within the composite during operations. To test this feature, composites were infiltrated with PCMs and enclosed in small containers made of carbon brake material. The composites were cemented into the carbon crucibles using a suitable adhesive such as SGL C-80 carbon cement to insure thermal contact with the carbon container. Lids were cemented in place using SGL C-80 carbon cement. The target thickness for the cement bond line was less than 0.020 inches (0.5 mm). FIG. 6 shows one such test coupon made of carbon brake material and PCM infiltrated composites. The coupons are approximately one-inch diameter and 0.6 inches tall. The PCM-infiltrated carbon fiber composite is approximately 0.75-inch diameter and 0.35 inch tall, and centered within the coupon as shown in the Figure.

Oxy-acetylene torch tests were conducted to evaluate the PCM brake system design concept. The test coupon was mounted on the test rack and subjected to different heating cycles that simulate different braking scenarios. The test coupon was heated at the bottom surface by an oxy-acetylene torch. A two-color pyrometer was used to measure the temperature of the test coupon at the top surface. Temperature vs. time was also charted continually for the duration of the torch heating and for five minutes of cool down to ensure that the tests simulated realistic braking profiles for the brake system. Table 1 contains the time-temperature profile of the three landing conditions simulated by the torch tests. All test coupons were weighed and measured before and after each torch test. Prior to testing the PCM infiltrated coupons, solid disk carbon specimens were torch tested to establish the torch settings needed to produce the desired heating rates for normal, overload, and RTO simulations. All test coupons were visually inspected before and after each torch test cycle. An optical microscope was used to inspect the lid seal after each torch test so that any PCM leak would be detected.

TABLE 1

| Braking Conditions | |
| --- | --- |
| Normal Stop | Room Temp to 538 °C. (1000 °F.) in 30 seconds |
| Overload Stop | Room Temp to 1038 °C. (1900 °F.) in 30 seconds |
| RTO | Room Temp to 1426 °C. (2600 °F.) in 30 seconds |

Post torch test examination on the samples indicated that PCM solidified well within the porous composite, as desired, even after seven landing simulations which include one normal stop, five overload stops, and one RTO. No PCM was detected in the disk carbon shell of the housing unit for the PCM infiltrated composite. The Si-based coating on individual fibers was found to be cracked and partially broken free of the VGCF, as shown in FIG. 7, which may be the result of strain introduced at the interface of the coating and the VGCF during the six PCM phase changing cycles. Despite the damage, the PCM re-solidified within the fiber composite.

One of the essential properties of the composite is its high thermal conductivity even at very high void fraction. Previous inventions, such as U.S. Pat. No. 5,007,478, which suggests using microencapsulated PCM slurry, provided a low thermally conductive medium, which hampered heat flow to PCM. Table 2 shows the measured thermal conductivity for the composites made. The high thermal conductivity ensures sufficient heat flow from brake disc to PCM, thus drastically increase heat capacity of the brake assembly.

TABLE 2

| Measured Thermal Conductivity for the High Void Composite, Assuming Fully Densified Carbon has Density of 2.1 g/cc | | | | |
| --- | --- | --- | --- | --- |
| Composite ID | Fiber Loading (%) | Density (g/cc) | Void Fraction (%) | R.T. Thermal Conductivity (W/mK) |
| HT-SS-1D | 10 | 0.33 | 84 | 53 |
| HT-SS-1D | 12 | 0.36 | 83 | 87 |
| HT-SS-1D | 15 | 0.42 | 80 | 117 |

It has been found that in order to contain liquid phase changing salts, a surface modification process should be employed to significantly raise the surface energy of the carbon fiber so that phase changing salt in its liquid phase will wet the surface of the fiber thus contain the salt within the boundaries of the composite.

One such surface modification process is to oxidize the fiber. By way of example, when a vapor grown carbon fiber (VGCF) is heated in a tube furnace 350° C. to 400° C. under $CO_2$ atmosphere, the oxidation increases fiber surface energies from about 20 to 70 $mJ/m^2$. The activated fiber has a high affinity for PCM. The desired oxidation, of course, will typically depend on the parameters of time and temperature of exposure.

Another surface modification process is to coat the composite with a high surface energy ceramic or metallic material. The choice of the coating material depends on the choice of phase change material, and the stability of the PCM/coating system through the desired lifetime and range of thermal cycles. For purposes of illustration, a ceramic coating, namely a Si based compound may be employed. Suitable coating equipment is shown in FIG. 9, and a standard SiC coating process may be used. It is contemplated that with composites having void fractions of over 80%, the coating will penetrate the composite and coat fiber surfaces in the bulk region. Testing has shown such to be the case.

The surface modification methodology, in addition to containing PCM, can also be used to modify fiber surface for composite fabrication. When making metal matrix composites, suitable materials are typically limited to metals that form carbide. However, if fiber surface modification is utilized, the choices for matrix materials is greatly expanded so that a plethora of new composites can be fabricated.

The application of a metallurgical coating, such as chromium, to carbon fibers will promote the adhesion of a metal material, such as copper. A current practice to improve the bonding between copper and graphite (carbon) fibers is to use an alloy of copper containing up to 1% chromium. The chromium forms a carbide on the surface of the fiber (e.g., $Cr_{23}C_6$ is the most stable of many possible chromium carbides) that bonds better to the copper than the pure carbon. However, the maximum usable concentration of chromium in an alloy is too little to assure the maximum possible density of bonds between the fiber and metal matrix. Application of a chromium coating directly to the fiber surface will ensure sufficient material for maximum bond density. This coating can be applied by a variety of means, including electroplating or chemical vapor infiltration.

Other coatings based on carbide formers, such as titanium diboride, are also candidates for coatings to generate the appropriate compatibility between the graphitic surfaces of the rigidized structure and the matrix material to be contained within the structure.

While reference has principally been made to use of the PCM/carbon composites as aircraft brakes, the present method of containing a phase change material in a porous carbon material can be used to produce other articles as well. Other applications include automotive and train brakes, industrial clutches and brakes, aerospace vehicle leading edges, heat shields, and re-entry nose tips. Other thermal management applications include heat exchangers and heat sinks, thermal storage devices, etc.

Further, the method of the present invention can be used to create high quality carbon fiber reinforced metal matrix composites. The improved adhesion between the metal and carbon fibers will increase the mechanical load transfer, the thermal transport properties, and allow the reinforcement to better moderate the CTE the matrix. Such metal matrix composites can be used for thermal management applications, including but not limited to cooling of electronic chips and packages.

Another application of the invention is in electronics cooling. Currently, the most popular method for cooling electronic devices is to use a fan to increase airflow speed. However, modern electronic devices such as cell phones, laptop computers, and Internet appliances may not be able to provide the necessary airflow speed to cool their vital chips. A PCM based heat sink, due to its high heat capacity, may reach equilibrium temperature at a lower airflow speed. Moreover, it is possible to selected a PCM so that the equilibrium temperature ensures a junction temperature of 125° C. or below, thus compensating for insufficient airflow speed.

Thus it can be seen that the benefits of the invention can be attained by the process presented and described above. While in accordance with the patent statutes only the best known and preferred embodiments of the invention have been presented and described in detail, the invention is not limited thereto or thereby. Accordingly, for an appreciation of the true scope and breadth of the invention, reference should be made to the following claims.

The invention claimed is:

1. A process for fabricating a carbon composite structure that is lightweight, structurally sound, and characterized by high heat capacity, comprising:
    forming a carbon structure with at least one cavity therein;
    placing a phase change medium within said cavity, said phase change medium demonstrating high energy absorption capacity, high thermal conductivity, and high void volume for phase change material retention; and
    closing said phase change medium within said cavity to allow vapor diffusion and liquid containment.

2. The process according to claim 1, wherein said phase change medium is formed from a carbon fiber to establish a high porosity medium having a large volume fraction available for containment of phase change material.

3. The process according to claim 1, wherein said phase change medium is formed from a carbon foam to establish a high porosity medium having a large volume fraction available for containment of phase change material.

4. The process according to claim 1, wherein said phase change medium is an isotropic high porosity medium.

5. The process according to claim 1, wherein said phase change medium is an anisotropic high porosity medium.

6. The process according to claim 1, further including the step of altering a surface energy of said carbon fibers of said phase change medium to enhance retention of phase change material.

7. The process according to claim 6, wherein said surface energy is enhanced by deposition of at least one of a carbide and ceramic formed by thermal decomposition of a precursor gas containing at least one of silicon, tantalum, titanium, molybdenum and nickel.

8. The process according to claim 6 wherein said surface energy is enhanced by deposition of one of a metallurgical and ceramic coating by decomposition of a precursor gas containing at least one of silicon, tantalum, titanium and molybdenum.

9. The process according to claim 6, wherein said surface energy is enhanced by electroless deposition of a precursor liquid containing at least one of silicon, tantalum, titanium, molybdenum and nickel.

10. The process according to claim 6, wherein said surface energy is enhanced by electroplating with a plating solution consisting of at least one of silicon, tantalum, titanium, chromium, molybdenum and nickel.

11. The process according to claim 6, wherein said surface energy is enhanced by etching said carbon fibers with at least one of gaseous water, carbon monoxide, carbon dioxide, oxygen, nitric acid and peracitic acid.

12. The process according to claim 6, wherein a phase change material retained by said high porosity medium is at least one of a lithium salt and a metal having a characteristic melting point.

13. The process according to claim 12, wherein said metal is a low melting metal and comprises one of copper and aluminum.

14. The process according to claim 6, wherein said phase change medium is formed from one of vapor grown carbon fibers and carbon foam.

15. The process according to claim 6, wherein said surface energy is enhanced by a coating deposited thereon having a thickness of 1–1000 nanometers.

16. The process according to claim 15, wherein said surface energy is enhanced by a coating deposited thereon having a coating volume fraction of between 0.001 and 0.1.

17. The process according to claim 15, wherein said surface energy is enhanced by alteration at temperatures between 400° C. and 1200 C.

* * * * *